(12) United States Patent
Shimizu et al.

(10) Patent No.: US 7,619,876 B2
(45) Date of Patent: Nov. 17, 2009

(54) SOLID ELECTROLYTIC CAPACITOR AND METHOD OF MANUFACTURING THE SAME

(75) Inventors: Kunihiko Shimizu, Sendai (JP); Takashi Mizukoshi, Sendai (JP); Koji Sakata, Sendai (JP)

(73) Assignee: NEC TOKIN Corporation, Sendai-shi (JP)

( * ) Notice: Subject to any disclaimer, the term of this patent is extended or adjusted under 35 U.S.C. 154(b) by 0 days.

(21) Appl. No.: 12/140,373

(22) Filed: Jun. 17, 2008

(65) Prior Publication Data

US 2008/0310081 A1 Dec. 18, 2008

(30) Foreign Application Priority Data

Jun. 18, 2007 (JP) ............................. 2007-160334

(51) Int. Cl.
*H01G 4/228* (2006.01)
*H01G 9/00* (2006.01)
(52) U.S. Cl. ..................... 361/540; 361/538; 29/25.03
(58) Field of Classification Search ................ 361/540, 361/538, 533, 531; 29/25.03
See application file for complete search history.

(56) References Cited

U.S. PATENT DOCUMENTS 5,644,281 A * 7/1997 Kuriyama ................... 337/295
5,784,248 A * 7/1998 Tomiyasu et al. ........... 361/523
5,805,413 A * 9/1998 Kurita ........................ 361/534
6,259,348 B1 * 7/2001 Kuriyama ................... 337/252

FOREIGN PATENT DOCUMENTS

| JP | 2001-244147 A | | 9/2001 |
| JP | 2001-267181 A | | 9/2001 |
| JP | 2001244145 A | * | 9/2001 |

* cited by examiner

*Primary Examiner*—Eric Thomas
(74) *Attorney, Agent, or Firm*—Frishauf, Holtz, Goodman & Chick, P.C.

(57) ABSTRACT

A solid electrolytic capacitor includes a porous sintered body made of a valve-acting metal and embedded with part of an anode lead having a protruding portion, a solid electrolyte layer formed in contact with a dielectric layer formed in the porous sintered body, a mounting anode terminal member, a mounting cathode terminal member, and an insulating casing resin. The capacitor further includes a small piece of a metal frame made of a valve-acting metal. This small piece of the metal frame is formed integrally with the protruding portion of the anode lead by cutting, after the anodic oxidation, the metal frame to which the protruding portion of the anode lead is fixed by resistance welding. The small piece of the metal frame and the mounting anode terminal member are connected together by wire bonding so that the anode lead and the mounting anode terminal member are electrically connected together.

18 Claims, 2 Drawing Sheets

SOLID ELECTROLYTIC CAPACITOR AND METHOD OF MANUFACTURING THE SAME

This application is based upon and claims the benefit of priority from Japanese patent application No. 2007-160334, filed on Jun. 18, 2007, the disclosure of which is incorporated herein in its entirely by reference.

BACKGROUND OF THE INVENTION

1. Field of the Invention

This invention relates to a small-size solid electrolytic capacitor using a high melting point material such as tantalum or niobium as a valve-acting metal and a method of manufacturing such a solid electrolytic capacitor.

2. Description of the Related Art

Solid electrolytic capacitors using a high melting point material such as tantalum or niobium as a valve-acting metal for an anode are small in size, large in capacitance, and excellent in frequency characteristics and have thus been widely used in decoupling circuits of CPUs (Central Processing Units) installed in electronic devices, power circuits of electronic devices, and so on. Such solid electrolytic capacitors are also installed in many portable electronic devices and, following the development of portable electronic devices, have been required to be still smaller in size and still larger in capacitance. Particularly, some of the small-type capacitors are called chip-type solid electrolytic capacitors each in the form of a product generally having an external shape of a rectangular parallelepiped with sides of several millimeters or less and covered with a casing resin.

The structure of a conventional general chip-type solid electrolytic capacitor will be described with reference to FIG. 4. FIG. 4 is a see-through diagram, as seen in a side direction, of the structure of the conventional chip-type solid electrolytic capacitor. In FIG. 4, an anode lead 1 is made of a metal such as tantalum or niobium, a porous sintered body 2 of the same kind of metal as the anode lead 1 is formed around the anode lead 1, and part of the anode lead 1 protrudes from the porous sintered body 2. Further, an anodized film layer is formed by anodic oxidation (anodization) at the surface of the porous sintered body 2. A solid electrolyte layer is formed on the surface of the anodized film layer and, on the surface of the solid electrolyte layer, a graphite layer and a cathode layer are formed in the order named. The anode lead 1, the porous sintered body 2, the anodized film layer, the solid electrolyte layer, the graphite layer, and the cathode layer are collectively called a capacitor element. In FIG. 4, however, the anodized film layer, the solid electrolyte layer, the graphite layer, and the cathode layer formed outside the porous sintered body 2 are not illustrated because they are thin as compared with the porous sintered body 2.

The fabrication sequence of this capacitor element will be described in the case of the capacitor being a tantalum solid electrolytic capacitor. At first, there are prepared a large number of rod-like anode leads 1 made of tantalum serving as a valve-acting metal. Then, each anode lead 1 is buried in porous tantalum powder, which is then subjected to press molding, thereby obtaining a porous body with one end of the anode lead 1 protruding from the porous body. Then, the porous body with the anode lead 1 is subjected to vacuum sintering, thereby obtaining a porous sintered body 2 with the anode lead 1. Then, a metal frame made of, for example, a stainless steel is prepared and end portions of the anode leads 1 protruding from the porous sintered bodies 2 respectively, are attached to the metal frame by welding or the like. The porous sintered bodies 2 attached to the metal frame through the anode leads 1 are immersed in an anodizing solution such as a hot phosphoric acid aqueous solution and a voltage is applied thereto to perform anodic oxidation to anodize the surfaces of the porous sintered bodies 2, thereby forming an anodized film layer at the surface of each porous sintered body 2. Then, a solid electrolyte layer is formed on the surface of each anodized film layer and, further, a graphite layer and a cathode layer are formed in the order named on each solid electrolyte layer at least at a part thereof, thereby obtaining capacitor elements.

Then, the end portions of the anode leads 1 fixed to the metal frame are cut so as to separate the capacitor elements from the metal frame. Since the length of the protruding portion of each anode lead 1 is shortened by this separation, it is necessary that the protruding length be determined taking into account a cutting margin in advance. Further, if droplets adhere to the metal frame, with the anode leads welded thereto, by evaporation and reliquefaction of the anodizing solution during the anodic oxidation, a bridge is formed between the metal frame and the surface of the anodizing solution due to the adhesion of droplets. In this case, both are shorted together so that it is not possible to apply an anodization voltage necessary for forming an anodized film layer at the surface of each porous sintered body 2. Therefore, it is necessary that the protruding length of each anode lead 1 be set to a value that allows the metal frame to be away from the surface of the anodizing solution so as to prevent occurrence of a short circuit. Since an anodized film layer is formed during the anodic oxidation on the protruding portion of each anode lead 1, part of it is stripped if necessary after the separation of the metal frame. Then, the anode lead 1 and the cathode layer of each capacitor element are electrically connected to two electrode terminals, respectively. Thereafter, each capacitor element is coated with an insulating casing resin 9 such that the electrode terminals are partly exposed on the surface of the resin, thereby obtaining chip-type solid electrolytic capacitors.

In the conventional example shown in FIG. 4, the anode lead 1 is connected to a mounting anode terminal member 5 through a metal bonding member 14 and the cathode layer is connected to a mounting cathode terminal member 4 through a conductive adhesive 7. The bonding member 14 may be made of any conductive material and is generally in the form of a metal block such as an aluminum block. Generally, the anode lead 1 and the bonding member 14 are fixedly connected together by resistance welding and the bonding member 14 and the mounting anode terminal member 5 are also fixedly connected together by resistance welding. The bonding member 14 has a trapezoidal shape in FIG. 4, but may have any shape depending on the necessity of design of a chip-type solid electrolytic capacitor. In FIG. 4, the anode lead 1 is welded to a side surface of the bonding member 14 and the bonding member 14 is disposed behind the anode lead 1 with respect to the sheet surface. On the other hand, the anode lead 1 is embedded so as to substantially pass through the middle of the porous sintered body 2.

Japanese Unexamined Patent Application Publication (JP-A) No. 2001-244147 (Patent Document 1) and Japanese Unexamined Patent Application Publication (JP-A) No. 2001-267181 (Patent Document 2) describe chip-type solid electrolytic capacitors different from the conventional structure described above. The chip-type solid electrolytic capacitor described in Patent Document 1 is characterized by using a metal wire with a fuse function, instead of the metal block, as the bonding member used in the foregoing conventional example, wherein use is made, as the metal wire, of a copper alloy or a 42 alloy (an alloy containing 42 wt % Ni and 58 wt % Fe) having a relatively low melting point. A mounting anode terminal member is provided at the bottom of the chip-type solid electrolytic capacitor so as to be partly exposed from an insulating casing resin and the metal wire is connected to the mounting anode terminal member by wire bonding or the like. On the other hand, the metal wire and an anode lead are bonded together under heat and pressure.

Also in Patent Document 2, an anode lead and a mounting anode terminal member are connected together by a metal wire. Like in Patent Document 1, a copper alloy or a 42 alloy is used as the metal wire. What is called the metal wire in Patent Document 2 is a columnar metal piece with a square or circular cross-section and with a size similar to that of the bonding member in the form of the metal block shown in FIG. 4. The metal wire and the anode lead are electrically connected together by resistance welding, while, the metal wire and the mounting anode terminal member are electrically connected together by a conductive adhesive.

SUMMARY OF THE INVENTION

For achieving a reduction in size and an increase in capacitance of a chip-type solid electrolytic capacitor, it is important to increase the volume efficiency representing a ratio in occupancy of a capacitor element to the volume of the entire chip-type solid electrolytic capacitor. However, as shown in FIG. 4, inside the chip-type solid electrolytic capacitor, the capacitor element is disposed so as to be offset to the right side in the figure and there is a region on the left side in the figure where only the protruding portion of the anode lead and the bonding member are present. It is important to reduce this region for improving the volume efficiency. However, conventionally, this region cannot be reduced due to the following reasons.

This region is further divided into a bonding member region where the bonding member such as the metal block connecting together the anode lead and the mounting anode terminal member is placed and an anode lead region occupied only by the protruding portion of the anode lead. In order to reduce the bonding member region, the bonding member itself needs to be formed thinner. However, in the case of connecting together the bonding member and the anode lead or the mounting anode terminal member by resistance welding with sufficient reliability, it is necessary to ensure a welding region of a certain area at each of connecting portions of both to be connected together. Therefore, it is not possible to reduce the cross-sectional area of the bonding member so much and thus there is a corresponding limit to the reduction of the bonding member region.

On the other hand, there is another problem in reducing the anode lead region. In the conventional example shown in FIG. 4 or the example described in Patent Document 2, the anode lead and the bonding member or the metal wire serving as the bonding member are connected together by resistance welding after the formation of the capacitor element. The resistance welding is a method that is generally highly reliable and is thus suitable for connection between internal components of a chip-type solid electrolytic capacitor. However, tantalum or niobium used as the anode lead is a high melting point material (melting point: tantalum; 2990° C., niobium; 2470° C., see Iwanami Physics and Chemistry Dictionary, 5th edition, vol. 3, Dec. 25, 1998, Iwanami Shoten) and, thus, when welding together this material and another metal, it necessary to heat welding portions thereof to a temperature at which the anode lead is melted.

However, it is said that a portion, exposed to a high temperature, of the anodized film layer in the capacitor element is partly changed from an amorphous phase to a crystalline phase. There is a problem that the insulating property is degraded and the leakage current increases in a region, changed to the crystalline phase, of the anodized film layer. Therefore, it is necessary that the welding portion of the anode lead with the bonding member be located away from an end face of the porous sintered body of the capacitor element so as to prevent the influence of heat conduction on the porous sintered body. Experientially, the separation distance between the end face of the porous sintered body and the welding portion of the anode lead is required to be 0.2 mm at minimum. Accordingly, it is necessary to provide the anode lead region over a length of 0.2 mm or more between the porous sintered body and the welding portion of the anode lead. This anode lead region is necessary not only in the case of the conventional example shown in FIG. 4, but also in the case of Patent Document 2 in which the metal wire and the anode lead are connected together by resistance welding.

On the other hand, in the case of Patent Document 1, the metal wire and the anode lead are connected together by heat-pressure bonding and the metal wire and the mounting anode terminal member are connected together by wire bonding. Since there are no portions connected together by resistance welding, it is not necessary to consider the influence by heat conduction and thus it is not necessary to provide an anode lead region between the porous sintered body and a heat-pressure bonding portion of the anode lead with the metal wire. Further, since, as different from the resistance welding, it is not necessary to provide a region of a certain area at the connecting portion, it is possible to make the metal wire to be used sufficiently thin to thereby reduce the bonding member region. However, it is known that a metal such as tantalum or niobium is generally very poor in wettability, and therefore, it is technically difficult to achieve highly reliable electrical connection between the anode lead and the metal wire by the use of a method such as heat-pressure bonding or soldering. That is, according to the method described in Patent Document 1, it is actually difficult to mass-produce highly reliable chip-type solid electrolytic capacitors at a high yield.

As a connection method without heating other than the above, a method is known using a conductive adhesive. However, if the conductive adhesive is used at a connecting portion between the metal wire and the anode lead, the metal surface of the anode lead is oxidized due to oxygen permeating the conductive adhesive so that the contact resistance increases. Therefore, there is a problem that the electrical characteristics of a sold electrolytic capacitor, such as tan δ (dielectric dissipation factor: ratio of current flowing in parasitic resistance, i.e. energy loss) and ESR (Equivalent Series Resistance), deteriorate.

It is therefore an object of this invention to provide a chip-type solid electrolytic capacitor and its manufacturing method that can reduce an anode lead region between a welding portion and a porous sintered body. This invention employs a method that can ensure reliable electrical connection between an anode lead and a bonding member.

According to an aspect of the invention, a solid electrolytic capacitor of this invention comprises a porous anode body formed with a dielectric layer, by anodic oxidation, on a surface of a porous sintered body made of a valve-acting metal and embedded with part of an anode lead having a protruding portion protruding from the porous sintered body, a cathode layer including a solid electrolyte layer formed in contact with the dielectric layer of the porous anode body, a mounting anode terminal member, a mounting cathode terminal member, and an insulating casing resin covering the protruding portion of the anode lead and the cathode layer except at least part of each of the mounting anode terminal member and the mounting cathode terminal member. The solid electrolytic capacitor further comprises a small piece of a metal frame made of a valve-acting metal. This small piece of the metal frame is formed integrally with the protruding portion of the anode lead by cutting, after the anodic oxidation, the metal frame to which the protruding portion of the anode lead is fixed by resistance welding. The small piece of the metal frame and the mounting anode terminal member are connected together by wire bonding so that the anode lead and the mounting anode terminal member are electrically connected together.

Preferably, a distance from a welding portion between said small piece of the metal frame and the protruding portion of the anode lead to an end, from which the anode lead protrudes, of the porous sintered body is 0.2 mm or less.

According to another aspect of this invention, a solid electrolytic capacitor of this invention comprises a porous anode body formed with a dielectric layer, by anodic oxidation, on a surface of a porous sintered body made of a valve-acting metal and embedded with part of an anode lead having a protruding portion protruding from the porous sintered body, a cathode layer including a solid electrolyte layer formed in contact with the dielectric layer of the porous anode body, an internal anode terminal and an internal cathode terminal formed on one surface of a substrate having a first and a second through hole, a mounting anode terminal member and a mounting cathode terminal member formed on a surface, opposite to the one surface, of the substrate, and an insulating casing resin covering the protruding portion of the anode lead and the cathode layer except at least part of each of the mounting anode terminal member and the mounting cathode terminal member. The solid electrolytic capacitor further comprises a small piece of a metal frame made of a valve-acting metal. This small piece of the metal frame is formed integral with the protruding portion of the anode lead by cutting, after the anodic oxidation, the metal frame to which the protruding portion of the anode lead is fixed by resistance welding. The small piece of the metal frame and the internal anode terminal are connected together by wire bonding so that the anode lead and the internal anode terminal are electrically connected together. The internal anode terminal and the mounting anode terminal member are electrically connected together through the first through hole formed in the substrate, and the internal cathode terminal and the mounting cathode terminal member are electrically connected together through the second through hole formed in the substrate.

According to still another aspect of this invention, there is obtained a solid electrolytic capacitor manufacturing method comprising burying an anode lead made of a valve-acting metal in porous powder made of a valve-acting metal so that part of the anode lead protrudes from the porous powder, and forming a porous sintered body by sintering, resistance-welding a metal frame made of a valve-acting metal to a protruding portion of the anode lead of the porous sintered body, anodizing the porous sintered body to form a porous anode body formed with a dielectric layer on a surface of the porous sintered body, cutting the metal frame so that part of the metal frame remains at the protruding portion of the anode lead, thereby forming a small piece of the metal frame, forming a cathode layer including a solid electrolyte layer on a surface of the porous anode body, electrically connecting a mounting anode terminal member and the small piece of the metal frame together by wire bonding, electrically connecting a mounting cathode terminal member and the cathode layer together by a conductive adhesive, and covering the protruding portion of the anode lead and the cathode layer with an insulating casing resin except at least part of each of the mounting anode terminal member and the mounting cathode terminal member.

According to this invention, an anode lead protruding from a porous sintered body and an aluminum metal frame are fixed together by resistance welding which is a highly reliable connection method, then, by immersion in an anodizing solution, an anodized film layer is formed at a surface of the porous sintered body by anodic oxidation. In this event, even if the aluminum metal frame and the porous sintered body are located very close to each other, since a crystallized oxide film formed at an end face of the porous sintered body and a surface of the anode lead during the resistance welding is replaced with an amorphous-phase oxide film like the other portion during the anodic oxidation, no degradation of the insulating property occurs in this region. Further, since the aluminum metal frame is used, even if the metal frame is brought close to the surface of the anodizing solution or immersed in the anodizing solution during the anodic oxidation, no short circuit occurs between the metal frame and the solution surface and, therefore, despite the above close arrangement, the stable anodic oxidation can be carried out.

Further, cutting is performed inside the aluminum metal frame after formation of a capacitor element so that a small piece of the metal frame remains at an end of a protruding portion of the anode lead of the capacitor element. Then, a cut surface of the small piece of the metal frame or a newly formed surface where an oxide film is removed and a mounting anode terminal member are electrically connected together by wire bonding. Using this technique, it is possible to reduce an anode lead region between the small piece of the aluminum metal frame and the end face of the porous sintered body, thereby enhancing the volume efficiency of a chip-type solid electrolytic capacitor.

DETAILED DESCRIPTION OF EXEMPLARY EMBODIMENTS

Figure 1:
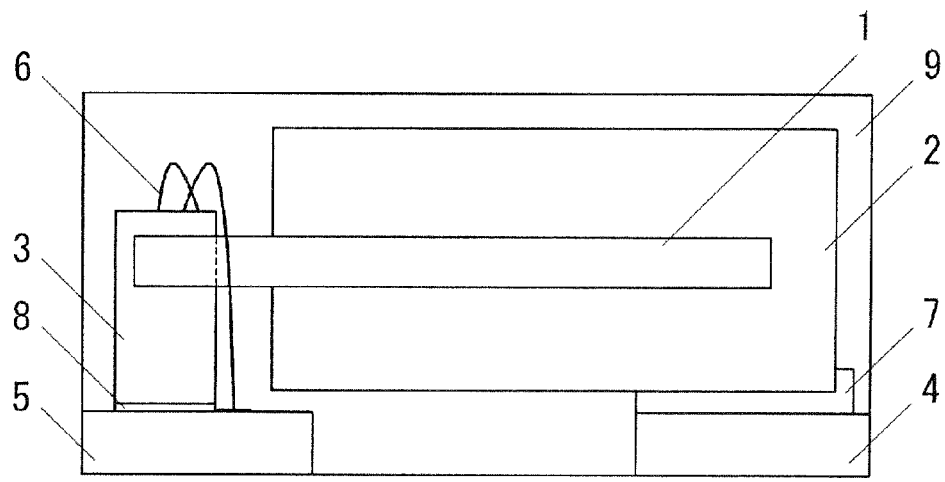
FIG. 1 is a see-through diagram, as seen in a side direction, of a chip-type solid electrolytic capacitor according to a first exemplary embodiment of this invention.

In exemplary embodiments of this invention, electrical connection between an anode lead and a bonding member is carried out by resistance welding being a connecting method whose reliability has been established. Further, a metal frame for use when carrying out anodic oxidation of the surfaces of porous sintered bodies is formed of aluminum being a valve-acting metal. Moreover, although, conventionally, the capacitor elements are separated from the metal frame by cutting the end portions of the anode leads after the formation of the cathode layers, the cutting positions are changed so that cutting is performed inside the aluminum metal frame in this invention. Thus, a small piece of the metal frame, i.e. a small aluminum piece, remains at the tip of a protruding portion of each anode lead. This small piece is used, instead of the bonding member in the conventional technique, as a component for electrical connection to a mounting anode terminal member.

Manufacturing processes of a chip-type solid electrolytic capacitor according to the exemplary embodiment of this invention will be described, wherein tantalum is used as a valve-acting metal. At first, like in the conventional case, there are prepared rod-like anode leads made of tantalum serving as a valve-acting metal. Then, the anode leads are buried in porous tantalum powder so as to partly protrude from the porous powder and, then, porous sintered bodies are formed by vacuum sintering. In this event, although one end of the anode lead protrudes from each porous sintered body, since there is no process of cutting an end portion of each anode lead as different from the conventional case, the protruding length of each anode lead may be set short. Then, the end portions of the protruding anode leads are fixed to an aluminum metal frame by resistance welding. In this event, in terms of mass productivity, it is necessary that the number of the end portions of the anode leads attached to the metal frame be as many as possible, so that the large number of porous sintered bodies are simultaneously mounted on the metal frame. Then, the porous sintered bodies are immersed in an anodizing solution such as a heated phosphoric acid aqueous solution so as to be subjected to anodic oxidation at a time, thereby forming a dielectric anodized film layer on the surface of each porous sintered body. In this event, an anodized film layer is simultaneously formed on the surface of each anode lead at its portion protruding from the porous sintered body.

When the anode lead made of tantalum is connected to the metal frame by resistance welding, a region in the vicinity of a welding region is exposed to a high temperature since the melting point of tantalum is high as described before, so that a crystallized oxide film is formed at the surfaces, close to the welding region, of the anode lead and the porous sintered body. However, since the anodic oxidation is carried out after the resistance welding in this invention, the crystallized oxide film is replaced with an amorphous-phase anodized film like the other portion during the anodic oxidation. Therefore, it is necessary that the metal frame be placed close to the surface of the anodizing solution or be partly immersed in the anodizing solution so that the crystallized oxide film at the surface of the porous sintered body is securely immersed into the anodizing solution. In this case, since the crystallized oxide film is reliably made to disappear during the anodic oxidation, it is not necessary to provide a certain distance as an anode lead region between the welding region of the anode lead and an end face of the porous sintered body for the resistance welding, which differs from the conventional method. Therefore, the close arrangement is allowed in which the welding region of the anode lead with the metal frame is provided closely at a distance of 0.2 mm or less from the end face of the porous sintered body, which cannot be realized by the conventional method.

When the metal frame with the anode leads welded thereto is brought close to the surface of the anodizing solution, droplets may adhere to the surface of the metal frame by evaporation and reliquefaction of the anodizing solution to form a bridge between the surface of the metal frame and the surface of the anodizing solution. In this case, the bridge may form a short circuit from the metal frame to the surface of the anodizing solution and, if that happens, an anodization voltage necessary for the anodic oxidation cannot be applied to the porous sintered bodies. However, as a result of studies by the present inventors, it has been found out that when the aluminum metal frame is used, a dielectric is also formed at the surface of the metal frame by the anodic oxidation and, therefore, the bridge causes no short circuit with the metal frame. Consequently, it is possible to continue applying the necessary anodization voltage to the porous sintered bodies and, even if the metal frame is brought close to the surface of the anodizing solution, the anodic oxidation can be carried out without any problem. Further, even if the aluminum metal frame is immersed in the anodizing solution, an anodized film is formed only at the surface of the metal frame, i.e. the inside of the metal frame is not corroded, and therefore, the anodic oxidation can also be carried out without any problem.

After the anodic oxidation, a solid electrolyte layer is formed on the surface of the anodized film layer formed at the surface of each porous sintered body and, further, a graphite layer and a cathode layer of a silver paste or the like are formed thereon, thereby obtaining capacitor elements. Then, the aluminum metal frame is cut on the basis of its welding portions with the anode leads so that a small piece of the metal frame remains together with each anode lead. Using a gold line that easily forms an alloy with aluminum, or an aluminum line, wire bonding is performed on a cut surface of each small piece of the metal frame to thereby establish electrical connection to a mounting anode terminal member. As described before, since the surface of a metal such as tantalum is very poor in wettability, it is difficult to perform wire bonding directly thereto. However, in the case of aluminum, wire bonding is generally easy on a surface where the oxide film is removed. In the case where the cut surface of the small piece of the metal frame cannot be used for wire bonding, part of the oxide film formed at the other surface of the small piece of the metal frame may be removed to form a fresh metal surface and wire bonding may be performed on this fresh metal surface.

On the other hand, a mounting cathode terminal member and the cathode layer of each capacitor element are electrically connected together by a conductive adhesive. The surface of the mounting cathode terminal member and the surface of the cathode layer are metal surfaces that are hardly oxidized and, therefore, even if the conductive adhesive is used, an increase in contact resistance due to permeating oxygen does not occur. Depending on the shape of the small piece of the metal frame, it may be fixed to the mounting anode terminal member by the use of an adhesive for increasing the mechanical connection strength inside the capacitor. The conductive adhesive may be used as this adhesive for a reason in terms of process such that the process of connection between the small piece of the metal frame and the mounting anode terminal member can be carried out simultaneously with the process of connection between the cathode layer and the mounting cathode terminal member. However, the electrical connection between the small piece of the metal frame and the mounting anode terminal member is, anyhow, carried out by wire bonding. In this event, the wire bonding may be carried out using a single metal wire, but not necessarily limited thereto, and two or more metal wires may be used taking into account the possibility of connection failure due to occurrence of breakage or loose contact of one or more of the metal wires. After establishing the electrical connection to these external terminals, each capacitor element and the foregoing associated components are coated with an insulating casing resin, thereby forming chip-type solid electrolytic capacitors. Then, aging and various inspections are performed, thereby obtaining the products.

In the foregoing description, tantalum is used as the valve-acting metal forming the anode lead and the porous sintered body. However, even when niobium is used as a valve-acting metal, it is possible to form, by entirely the same method, a chip-type solid electrolytic capacitor in which a porous sintered body and a welding region of a small piece of a metal frame are close to each other.

Table 1 summarizes the conventional chip-type solid electrolytic capacitor manufacturing method using the metal frame of the stainless steel or the like and the foregoing chip-type solid electrolytic capacitor manufacturing method according to this invention.

TABLE 1

| Process | Conventional Method | This Invention |
|---|---|---|
| formation of porous sintered body | press/sintering | press/sintering |
| frame attaching | resistance welding of stainless steel frame or the like | resistance welding of aluminum frame |
| anodic oxidation | place frame away from solution surface | place frame close to solution surface or immerse frame in solution |
| formation of solid electrolyte layer, graphite layer, cathode layer | performed while connected to frame | performed while connected to frame |
| frame separation | cut end portion of anode lead | cut inside frame |
| connection to mounting electrode | anode: resistance welding cathode: conductive adhesive | anode: wire bonding cathode: conductive adhesive |
| formation of casing | coat insulating casing resin | coat insulating casing resin |
| inspection process | aging/inspection | aging/inspection |

Hereinbelow, chip-type solid electrolytic capacitors and manufacturing methods thereof according to exemplary embodiments of this invention will be described with reference to the drawings.

First Exemplary Embodiment

Figure 4:
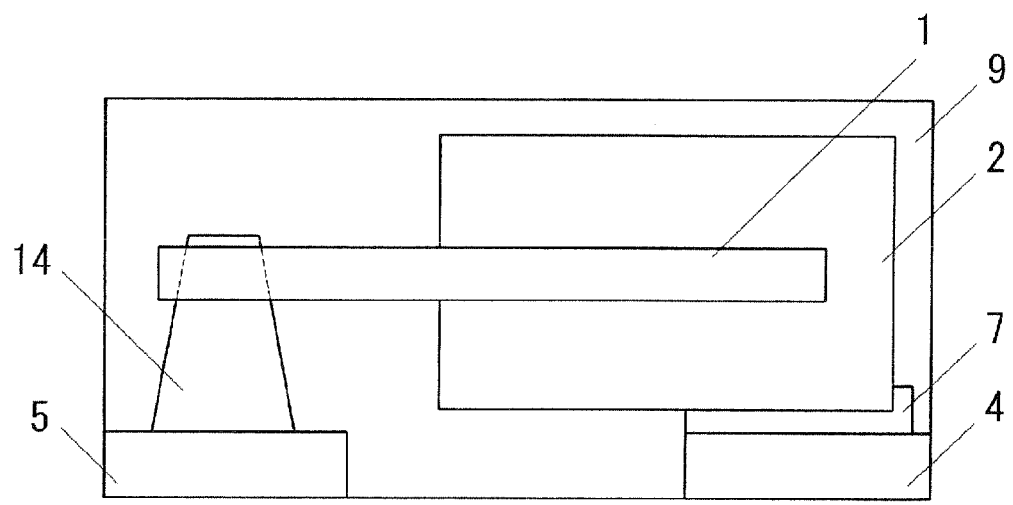
FIG. 4 is a see-through diagram, as seen in a side direction, of a conventional general chip-type solid electrolytic capacitor.

FIG. 1 is a see-through diagram, as seen in a side direction, showing an example of the structure of a chip-type solid electrolytic capacitor according to a first exemplary embodiment of this invention. In FIG. 1, like in the conventional example shown in FIG. 4, an anode lead 1 is made of a metal such as tantalum or niobium and a porous sintered body 2 of the same kind of metal as the anode lead 1 is formed around the anode lead 1. Although not illustrated, an anodized film layer, a solid electrolyte layer, a graphite layer, and a cathode layer are formed in the order named on the surface of the porous sintered body 2 and these various components including the anode lead 1 form a capacitor element. The anodized film layer, the solid electrolyte layer, the graphite layer, and the cathode layer are each much thinner than the porous sintered body 2. A small piece 3 of a metal frame made of aluminum is fixed to a protruding portion, protruding from the porous sintered body 2, of the anode lead 1 by resistance welding. Further, a mounting anode terminal member 5 and a mounting cathode terminal member 4 serving as external terminals are provided at the bottom of the chip-type solid electrolytic capacitor. Spaces between these respective components are filled with an insulating casing resin 9 so that only the mounting anode terminal member 5 and the mounting cathode terminal member 4 are partly exposed on the surface of the chip-type solid electrolytic capacitor.

The small piece 3 of the metal frame and the mounting anode terminal member 5 are electrically connected together by bonding wires 6, while the cathode layer and the mounting cathode terminal member 4 are electrically connected together by a conductive adhesive 7. The small piece 3 of the metal frame and the mounting anode terminal member 5 are also connected together by an adhesive 8, which is for the purpose of firmly fixing both together. When the conductive adhesive is used as the adhesive 8, there is an advantage in terms of process in that the connection between the small piece 3 of the metal frame and the mounting anode terminal member 5 can be carried out simultaneously with the electrical connection between the cathode layer and the mounting cathode terminal member 4. Further, the formation of the conduction path by the conductive adhesive resultantly contributes to improvement in connection reliability for disconnection of wire bonding or the like. In FIG. 1, the number of the bonding wires 6 illustrated is two, but it may be one or more than two.

In FIG. 1, the anode lead 1 is welded to a side surface of the small piece 3 of the metal frame and thus the small piece 3 of the metal frame is actually disposed behind the anode lead 1 with respect to the sheet surface. On the other hand, the anode lead 1 is embedded so as to substantially pass through the middle of the porous sintered body 2. The position of the bonding wire 6 is arbitrary as long as it can connect together the small piece 3 of the metal frame and the mounting anode terminal member 5. However, it is necessary that a bonding surface of the small piece 3 of the metal frame be a cut surface separated from the metal frame or a new surface where an oxide film is stripped.

Next, a description will be given of a manufacturing method of fa chip-type solid electrolytic capacitor in connection with the first exemplary embodiment of this invention.

At first, there are prepared a large number of anode leads made of tantalum. Then, pressed compacts of porous tantalum powder each embedded with the anode lead are subjected to vacuum sintering, thereby forming porous sintered bodies. Part of the anode lead protrudes from one end of each porous sintered body. Then, an aluminum metal frame is prepared and protruding ends of the anode leads of the porous sintered bodies are fixed to the metal frame by resistance welding. The reason for attaching the large number of porous sintered bodies to the metal frame is to enhance the productivity. In this event, the distance between an end face of each porous sintered body and a welding portion of the aluminum metal frame is set to 0.2 mm or less. This distance may be set shorter. As the distance is shortened, the volume efficiency of the chip-type solid electrolytic capacitor can be enhanced. In this event, a crystallized oxide film is formed at a part of the surface of each porous sintered body by heat conduction due to the shortening of the distance. However, since this oxide film is converted to an amorphous phase by anodic oxidation in a subsequent anodization process, no problem is raised.

Then, the porous sintered bodies fixed to the metal frame are immersed in an anodizing solution such as a hot phosphoric acid aqueous solution and applied with a voltage so as to be subjected to the anodic oxidation. By this anodic oxidation, an anodized film layer of $Ta_2O_5$ serving as a dielectric layer is formed on the surface of each porous sintered body. In this event, although a bridge is formed between the metal frame and the surface of the anodizing solution by evaporation and reliquefaction of the anodizing solution, since the surface of the metal frame of aluminum being a valve-acting metal is also oxidized so as to be formed with an oxide film, a contact portion with the bridge becomes a dielectric to prevent a short circuit and a voltage drop. Then, a solid electrolyte layer is formed on the surface of the anodized film layer formed at the surface of each porous sintered body. As the solid electrolyte layer, an MnO$_2$ layer may be formed by thermal decomposition of manganese nitrate or a conductive polymer layer may be formed by polymerization of pyrrole, thiophene, or a derivative thereof. Then, a graphite paste and a silver paste are coated in the order named on the surface of each solid electrolyte layer at least at a part thereof, thereby obtaining capacitor elements each having a graphite layer and a cathode layer.

Then, the metal frame is cut at its portions where the anode leads are resistance-welded, respectively, thereby obtaining small pieces of the metal frame each having the capacitor element fixed thereto. Furthers a cut surface of each small piece of the metal frame and a mounting anode terminal member serving as an external terminal of the chip-type solid electrolytic capacitor are electrically connected together by wire bonding. As a material of a bonding wire, it is preferable to use a gold line having the property of easily forming an alloy with aluminum forming the small piece of the metal frame, or an aluminum line. Unless the small piece of the metal frame is formed with a surface where a fresh metal surface is exposed and which is flat and suitable for wire bonding connection, it is necessary to newly form a surface suitable for wire bonding by stripping the oxide film by means of polishing or the like.

In ultrasonic bonding at the time of the wire bonding, a component directly applied with vibration is the small piece of the metal frame and thus the ultrasonic vibration is transmitted to the porous sintered body through the two components, i.e. the small piece of the metal frame and the anode lead. Therefore, there hardly occurs damage such as breakage of the anodized film layer being the dielectric due to the vibration during the bonding. Further, since the wire-bonding connection object is not a high melting point material such as tantalum, but is low melting point aluminum, the heating temperature required can be set low. Further, the wire-bonding heating position can be located away from the welding portion of the anode lead. As a result of them, the influence of heat conduction on the anodized film layer due to the wire bonding can be sufficiently reduced, thereby preventing the breakage of the anodized film layer. Owing to the above effects, even if the distance between the welding portion of the anode lead and the end face of the porous sintered body is set short, it is possible to sufficiently reduce the possibility that the dielectric layer of the capacitor element is broken due to the wire bonding.

The wire bonding has been field-proven as a semiconductor manufacturing technique and is known as an electrical connection method excellent in connection reliability. Therefore, high connection reliability can also be achieved when this technique is applied to the chip-type solid electrolytic capacitor manufacturing process. Particularly, when the gold line is used as the bonding wire, tan δ and ESR can be sufficiently reduced because of its low resistance. Although the small piece of the aluminum metal frame is electrically connected to the mounting anode terminal member by the wire bonding, in the case where the electrical connection between the capacitor element and the mounting anode terminal member or the mounting cathode terminal member is disturbed by deformation caused by thermal stress due to thermal expansion of an insulating casing resin and so on, the small piece of the metal frame and the mounting anode terminal member may be fixed together by the use of an adhesive to thereby provide a countermeasure against the deformation caused by the thermal stress. In this event, if a conductive adhesive is used, the fixing operation can be carried out in the same process of fixation between the cathode layer and a mounting cathode terminal member by the use of the conductive adhesive, which is thus advantageous.

Since the electrical connection established by the conductive adhesive provides a conduction path, in addition to the wire bonding, between the small piece of the metal frame and the mounting anode terminal member, it is advantageous in terms of improving the connection reliability to disconnection or the like. However, as described before, since there is the problem of the increase in contact resistance at the contact surfaces due to oxygen permeating the conductive adhesive, this conduction path cannot be used as a main electrical conduction path to the mounting anode terminal member. The main electrical connection between the small piece of the metal frame and the mounting anode terminal member is, anyhow, achieved through the wire bonding path. In this event, the wire bonding path is not necessarily limited to one, but two or more bonding wires, i.e. paths, may be provided taking into account the possibility of disconnection due to the molding pressure at the time of coating the insulating casing resin or due to the generation of thermal stress caused by soldering reflow. A lead frame of a conventional structure can be used as the mounting anode terminal member and the mounting cathode terminal member. The mounting cathode terminal member and the cathode layer of each capacitor element are connected together by the use of the conductive adhesive containing a silver filler or the like and, then, the insulating casing resin is coated over each capacitor element. Then, aging and property inspections are performed.

Second Exemplary Embodiment

Figure 2:
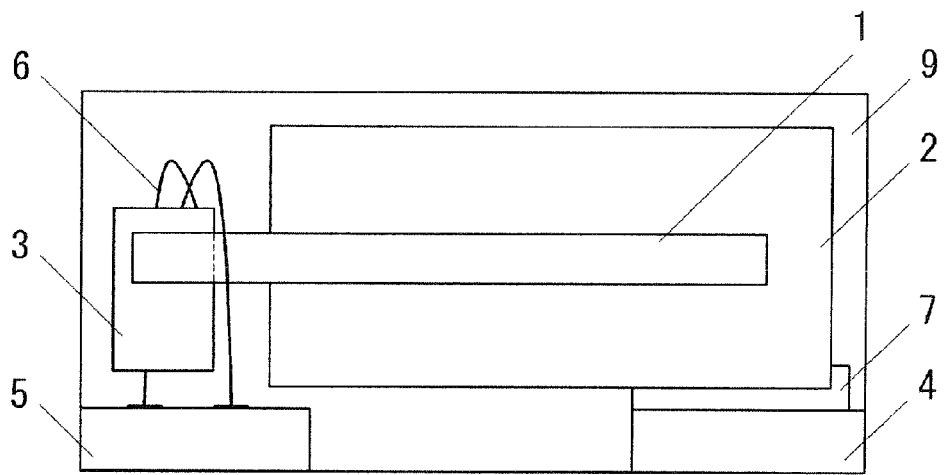
FIG. 2 is a see-through diagram, as seen in a side direction, of a chip-type solid electrolytic capacitor according to a second exemplary embodiment of this invention.

FIG. 2 is a see-through diagram, as seen in a side direction, showing an example of the structure of a chip-type solid electrolytic capacitor according to a second exemplary embodiment of this invention. In FIG. 2, a region of an adhesive for fixing together a small piece 3 of a metal frame and a mounting anode terminal member 5 is not provided therebetween, so that both are electrically connected together only by one or more bonding wires and an insulating casing resin 9 is filled therebetween.

Also in this exemplary embodiment, an anode lead 1 is welded to a side surface of the small piece 3 of the metal frame and thus the small piece 3 of the metal frame is actually disposed behind the anode lead 1 with respect to the sheet surface, while, the anode lead 1 is embedded so as to substantially pass through the middle of a porous sintered body 2. The position of a bonding wire 6 is arbitrary as long as it can connect together the small piece 3 of the metal frame and the mounting anode terminal member 5, but a bonding surface of the small piece 3 of the metal frame is a cut surface separated from the metal frame or a new surface where an oxide film is stripped.

Third Exemplary Embodiment

Figure 3:
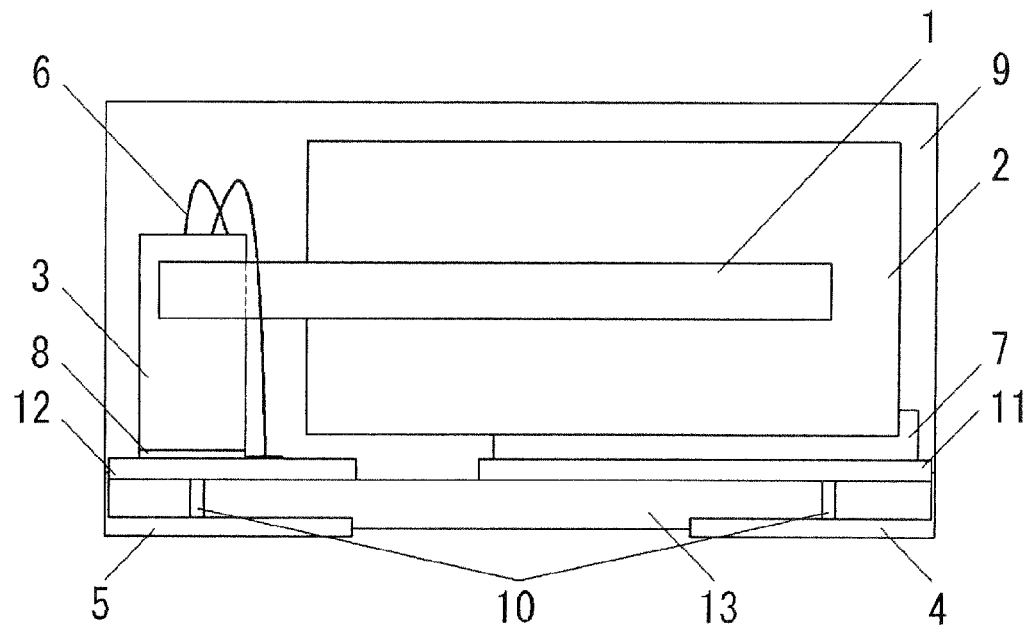
FIG. 3 is a see-through diagram, as seen in a side direction, of a chip-type solid electrolytic capacitor according to a third exemplary embodiment of this invention.

FIG. 3 is a see-through diagram, as seen in a side direction, showing an example of the structure of a chip-type solid electrolytic capacitor according to a third exemplary embodiment of this invention. In FIG. 3, a substrate 13 is newly provided and a mounting anode terminal member 5 and a mounting cathode terminal member 4 are formed on the surface of the substrate 13. A small piece 3 of a metal frame is electrically connected to an internal anode terminal 12 on the back surface of the substrate 13 through bonding wires 6, while, a cathode layer of a capacitor element is electrically connected to an internal cathode terminal 11 on the back surface of the substrate 13 through a conductive adhesive 7.

Further, the small piece 3 of the metal frame is fixed to the internal anode terminal 12 by an adhesive 8. The internal anode terminal 12 and the mounting anode terminal member 5 sandwiching the substrate 13 therebetween are electrically connected together through a through hole 10 passing through the substrate 13. Likewise, the internal cathode terminal 11 and the mounting cathode terminal member 4 sandwiching the substrate 13 therebetween are electrically connected together through a through hole 10 passing through the substrate 13.

The positional relationship between the small piece 3 of the metal frame and an anode lead 1 and a bonding surface, bonded with the bonding wires 6, of the small piece 3 of the metal frame are the same as those described in the first exemplary embodiment.

The chip-type solid electrolytic capacitor in this third exemplary embodiment is configured such that the mounting anode terminal member and the mounting cathode terminal member are respectively provided on the substrate in the chip-type solid electrolytic capacitor in the first exemplary embodiment. This substrate is formed with the through holes and the internal anode terminal and the internal cathode terminal are provided on the back surface of the substrate and electrically connected to the mounting anode terminal member and the mounting cathode terminal member through the through holes, respectively. The small piece of the metal frame is connected to the internal anode terminal through the wire bonding and the adhesive, while, the cathode layer of the capacitor element is connected to the internal cathode terminal through the conductive adhesive. Since the mounting anode terminal member and the mounting cathode terminal member are provided on the substrate, the external electrode terminals can be formed by electrode foils or the like, i.e. without using a lead frame or the like.

EXAMPLES

Chip-type solid electrolytic capacitors were actually fabricated as Examples based on the first, second, and third exemplary embodiments of this invention and then the electrical characteristics thereof were measured. Further, as Comparative Examples, chip-type solid electrolytic capacitors were fabricated according to the conventional method in which a metal frame is cut and separated after anodic oxidation and then an anode lead and a bonding member are connected together by resistance welding, and then the electrical characteristics thereof were measured in the same manner. The samples of Examples and the samples of Comparative Examples respectively had different shapes by changing their fabrication conditions, and their volume efficiencies, improved amounts, and values of electrical characteristics such as tan δ and ESR were compared.

At first, a chip-type solid electrolytic capacitor having a capacitance of 10 μF was studied as a standard capacitor. The capacitor of this capacitance was realized when the size of a porous sintered body alone was 1.0 mm (length)×0.6 mm (width)×0.3 mm (height). When realizing a chip-type solid electrolytic capacitor having a porous sintered body of this size by the conventional method, 0.2 mm is required as a length of an anode lead region at minimum as described before. When fabricating the conventional capacitor having the shape shown in FIG. 4, the external size of the chip-type solid electrolytic capacitor including the insulating casing resin, the mounting anode terminal member, and the mounting cathode terminal member was 1.6 mm (length)×0.85 mm (width)×0.5 mm (height). In this case, the volume efficiency (a ratio of the volume of a porous sintered body to the volume of the entire chip-type solid electrolytic capacitor) is 0.265. In the case of the conventional chip-type solid electrolytic capacitor, if the external size, i.e. the length, the width, or the height, is reduced as compared with the above size, there arises a problem such that the insulating casing resin becomes too thin to maintain a necessary strength or regions for disposing the terminal members cannot be ensured.

With respect to a chip-type solid electrolytic capacitor of this invention, consideration is given to the case where an anode lead region is reduced from this shape to improve the volume efficiency thereby improving the characteristics of the capacitor. Herein, even if the improvement in volume efficiency is allotted to an improvement in capacitance of the capacitor, its improved amount is only ten-odd percent which cannot be said to be a significant value as compared with the general variation standard (±20%) of the capacitance. Since there is an increasing demand particularly for height reduction of chip-type solid electrolytic capacitors, the improvement in volume efficiency is allotted not to an increase in capacitance but to a reduction in chip height. In this case, the length and the width are constant in the external size.

The length of an anode lead region is shortened from initial 0.2 mm to 0.12 mm, 0.08 mm, and 0 mm in the order named, while, the length of a porous sintered body incorporated in a chip-type solid electrolytic capacitor is increased correspondingly. Since the total sum of the length of the porous sintered body and the length of the anode lead region is not changed, the external length of the chip-type solid electrolytic capacitor is not changed. Herein, since an anodized film layer having large roughness is formed over substantially the entire porous sintered body, the facing area between the anode side and the cathode side at this layer is considered to be approximately proportional to the volume of the porous sintered body. Therefore, when the bottom area of the porous sintered body is increased due to the reduction in length of the anode lead region, its increased amount is approximately proportional to an increased amount of the capacitance. Conversely, when the height of the porous sintered body is reduced correspondingly to maintain the volume of the porous sintered body constant, the capacitance is also maintained approximately constant.

On the basis of the above study, 20 chip-type solid electrolytic capacitors were fabricated according to each of Examples of the first, second, and third exemplary embodiments of this invention and each of Comparative Examples and values of capacitance, tan δ, and ESR thereof were measured to judge acceptance or rejection. Values of the length and the width in the external size are the same over all capacitor elements and only the height is changed. The results are shown in Table 2. In Table 2, the external length and width of each chip-type solid electrolytic capacitor are 1.6 mm and 0.85 mm, respectively, and the external heights of the capacitors are as shown in Table 2.

The widths of incorporated porous sintered bodies are commonly 0.6 mm and their heights have values obtained by subtracting 0.2 mm from the external heights of the respective capacitors. The volume efficiency is a calculated value. The improved amount is a value representing an improved degree of volume efficiency on the basis of the volume efficiency obtained when the length of an anode lead region is 0.2 mm in each of the exemplary embodiments. The values of capacitance, tan δ, and ESR are measured values. The electrical characteristics of Examples and Comparative Examples each are average values of measured values of 20 samples. Further,

TABLE 2

| name | embodiment | Anode Lead Region | Length of Porous Sintered Body | External Height | Volume Efficiency | Improved Amount | Capacitance (µF) | tan δ | ESR (mΩ) | Acceptance or Rejection |
|---|---|---|---|---|---|---|---|---|---|---|
| Example 1 | first | 0.2 mm | 1.0 mm | 0.5 mm | 0.265 | 1 | 10.5 | 0.037 | 189 | ○ |
| Example 2 | first | 0.12 mm | 1.08 mm | 0.478 mm | 0.277 | 1.05 | 10.2 | 0.039 | 192 | ○ |
| Example 3 | first | 0.08 mm | 1.12 mm | 0.468 mm | 0.283 | 1.07 | 9.9 | 0.041 | 204 | ○ |
| Example 4 | first | 0 mm | 1.2 mm | 0.45 mm | 0.294 | 1.11 | 9.7 | 0.043 | 207 | ○ |
| Example 5 | second | 0.2 mm | 1.0 mm | 0.5 mm | 0.265 | 1 | 10.4 | 0.038 | 191 | ○ |
| Example 6 | second | 0.12 mm | 1.08 mm | 0.478 mm | 0.277 | 1.05 | 10.1 | 0.040 | 199 | ○ |
| Example 7 | second | 0.08 mm | 1.12 mm | 0.468 mm | 0.283 | 1.07 | 10.2 | 0.039 | 196 | ○ |
| Example 8 | second | 0 mm | 1.2 mm | 0.45 mm | 0.294 | 1.11 | 9.8 | 0.041 | 204 | ○ |
| Example 9 | third | 0.2 mm | 1.0 mm | 0.5 mm | 0.265 | 1 | 10.7 | 0.038 | 190 | ○ |
| Example 10 | third | 0.12 mm | 1.08 mm | 0.478 mm | 0.277 | 1.05 | 10.1 | 0.040 | 199 | ○ |
| Example 11 | third | 0.08 mm | 1.12 mm | 0.468 mm | 0.283 | 1.07 | 9.9 | 0.042 | 208 | ○ |
| Example 12 | third | 0 mm | 1.2 mm | 0.45 mm | 0.294 | 1.11 | 9.7 | 0.043 | 212 | ○ |
| Comparative Example 1 | — | 0.2 mm | 1.0 mm | 0.5 mm | 0.265 | 1 | 10.4 | 0.043 | 215 | ○ |
| Comparative Example 2 | — | 0.12 mm | 1.08 mm | 0.478 mm | 0.277 | 1.05 | 10.2 | 0.086 | 458 | x |
| Comparative Example 3 | — | 0.08 mm | 1.12 mm | 0.468 mm | 0.283 | 1.07 | 9.8 | 0.156 | 896 | x |
| Comparative Example 4 | — | 0 mm | 1.2 mm | 0.45 mm | 0.294 | 1.11 | 9.4 | 0.264 | 1524 | x | acceptance or rejection is judged such that when values of tan δ and ESR fall within respective standards (tan δ: 0.04+0.005 or less, ESR: 300 mΩ) or less), it is judged to be acceptance ("○" is assigned). There was no sample in which a value of capacitance (µF) deviated from a standard of 10±2.0 µF.

In Table 2, in each of the chip-type solid electrolytic capacitors of Examples 1 to 4 based on the first exemplary embodiment of this invention, the electrical characteristics are excellent and, even if the anode lead region is shortened and the external height is lowered, the fabricated capacitor element has no inferiority to Comparative Example 1. This tendency also applies to Examples 5 to 8 based on the second exemplary embodiment of this invention and Examples 9 to 12 based on the third exemplary embodiment of this invention, wherein even when the anode lead region is entirely omitted, no particular problem arises in terms of the characteristics of the capacitor. On the other hand, in each of Comparative Examples 2 to 4 in which the anode lead region is shortened or entirely omitted in the conventional configuration, the values of tan δ and ESR are degraded to deviate from the standards. This is considered to be caused by the fact that a crystalline phase is formed in an anodized film layer near an end face of the porous sintered body due to resistance welding to the anode lead so that a leakage current occurs. Therefore, in this case, it is not possible to achieve an improvement in volume efficiency of the capacitor. It is seen that the method proposed in this invention is effective for achieving a reduction in height of chip-type solid electrolytic capacitors.

As described above, according to a chip-type solid electrolytic capacitor of this invention, an aluminum metal frame to which an anode lead is resistance-welded is used in anodization of the surface of a porous sintered body and, thereafter, cutting is performed inside the metal frame so that a small piece of the metal frame remains at an end of the anode lead. Then, a mounting anode terminal member and the small piece of the metal frame are electrically connected together by wire bonding, so that it is possible to provide a chip-type solid electrolytic capacitor that does not require provision of an anode lead region and that is improved in volume efficiency.

While this invention has been described in terms of the exemplary embodiments, this invention is not to be limited thereto and design changes not departing from the gist of this invention are also included in this invention. That is, this invention naturally includes various modifications and changes that may be performed by a person skilled in the art.

What is claimed is:

1. A solid electrolytic capacitor comprising:
   a porous anode body formed with a dielectric layer, by anodic oxidation, on a surface of a porous sintered body made of a valve-acting metal and embedded with part of an anode lead having a protruding portion protruding from said porous sintered body;
   a cathode layer including a solid electrolyte layer formed in contact with said dielectric layer of said porous anode body;
   a mounting anode terminal member;
   a mounting cathode terminal member;
   an insulating casing resin covering said protruding portion of said anode lead and said cathode layer except at least part of each of said mounting anode terminal member and said mounting cathode terminal member; and
   a small piece of a metal frame made of a valve-acting metal, said small piece formed integral with said protruding portion of said anode lead by cutting, after said anodic oxidation, said metal frame to which said protruding portion of said anode lead is fixed by resistance welding,
   wherein said small piece of said metal frame and said mounting anode terminal member are connected together by wire bonding so that said anode lead and said mounting anode terminal member are electrically connected together.

2. A solid electrolytic capacitor according to claim 1, further comprising:
   an insulating substrate having one surface formed with said mounting anode terminal member and said mounting cathode terminal member; and
   an internal anode terminal and an internal cathode terminal formed on another surface, opposite to said one surface, of said insulating substrate,
   wherein said small piece of said metal frame and said internal anode terminal are connected together by wire bonding so that said anode lead and said internal anode terminal are electrically connected together, said internal anode terminal and said mounting anode terminal member are electrically connected together through a through hole formed in said insulating substrate, and said internal cathode terminal and said mounting cathode terminal member are electrically connected together through a through hole formed in said insulating substrate.

3. A solid electrolytic capacitor according to claim 1, wherein two or more conduction paths are formed by said wire bonding.

4. A solid electrolytic capacitor according to claim 1, wherein said wire bonding is performed using a gold line.

5. A solid electrolytic capacitor according to claim 1, wherein said small piece of said metal frame and said mounting anode terminal member are fixed together by an adhesive.

6. A solid electrolytic capacitor according to claim 5, wherein said adhesive is a conductive adhesive.

7. A solid electrolytic capacitor according to claim 2, wherein said small piece of said metal frame and said internal anode terminal are fixed together by an adhesive.

8. A solid electrolytic capacitor according to claim 7, wherein said adhesive is a conductive adhesive.

9. A solid electrolytic capacitor according to claim 1, wherein said anode lead and said porous sintered body are each formed of tantalum.

10. A solid electrolytic capacitor according to claim 1, wherein said anode lead and said porous sintered body are each formed of niobium.

11. A solid electrolytic capacitor according to claim 1, wherein said small piece of said metal frame is made of aluminum.

12. A solid electrolytic capacitor according to claim 1, wherein a distance from a welding portion between said small piece of said metal frame and said protruding portion of said anode lead to an end, from which said anode lead protrudes, of said porous sintered body is 0.2 mm or less.

13. A solid electrolytic capacitor according to claim 1, wherein said solid electrolytic capacitor is a chip-type solid electrolytic capacitor.

14. A solid electrolytic capacitor comprising:

a porous anode body formed with a dielectric layer, by anodic oxidation, on a surface of a porous sintered body made of a valve-acting metal and embedded with part of an anode lead having a protruding portion protruding from said porous sintered body;

a cathode layer including a solid electrolyte layer formed in contact with said dielectric layer of said porous anode body;

an internal anode terminal and an internal cathode terminal formed on one surface of a substrate having a first and a second through hole;

a mounting anode terminal member and a mounting cathode terminal member formed on a surface, opposite to said one surface, of said substrate;

an insulating casing resin covering said protruding portion of said anode lead and said cathode layer except at least part of each of said mounting anode terminal member and said mounting cathode terminal member; and a small piece of a metal frame made of a valve-acting metal, said small piece formed integral with said protruding portion of said anode lead by cutting, after said anodic oxidation, said metal frame to which said protruding portion of said anode lead is fixed by resistance welding, wherein said small piece of said metal frame and said internal anode terminal are connected together by wire bonding so that said anode lead and said internal anode terminal are electrically connected together, said internal anode terminal and said mounting anode terminal member are electrically connected together through said first through hole formed in said substrate, and said internal cathode terminal and said mounting cathode terminal member are electrically connected together through said second through hole formed in said substrate.

15. A solid electrolytic capacitor manufacturing method comprising:

burying an anode lead made of a valve-acting metal in porous powder made of a valve-acting metal so that part of said anode lead protrudes from said porous powder, and sintering said porous powder with the anode lead to form a porous sintered body;

resistance-welding a metal frame made of a valve-acting metal to a protruding portion of said anode lead of said porous sintered body;

anodizing said porous sintered body to form a porous anode body formed with a dielectric layer on a surface of said porous sintered body;

cutting said metal frame so that part of said metal frame remains at said protruding portion of said anode lead, thereby forming a small piece of said metal frame;

forming a cathode layer including a solid electrolyte layer on a surface of said porous anode body;

electrically connecting a mounting anode terminal member and said small piece of said metal frame together by wire bonding;

electrically connecting a mounting cathode terminal member and said cathode layer together by a conductive adhesive; and covering said protruding portion of said anode lead and said cathode layer with an insulating casing resin except at least part of each of said mounting anode terminal member and said mounting cathode terminal member.

16. A solid electrolytic capacitor manufacturing method according to claim 15, further comprising fixing said mounting anode terminal member and said small piece of said metal frame together by an adhesive.

17. A solid electrolytic capacitor manufacturing method according to claim 15, wherein said anode lead and said porous sintered body are made of tantalum or niobium and said metal frame is made of aluminum.

18. A solid electrolytic capacitor manufacturing method according to claim 15, wherein a distance from a welding portion between said small piece of said metal frame and said protruding portion of said anode lead to an end, from which said anode lead protrudes, of said porous sintered body is 0.2 mm or less.

* * * * *